United States Patent
Kitani et al.

(10) Patent No.: US 8,655,364 B2
(45) Date of Patent: Feb. 18, 2014

(54) MOBILE COMMUNICATION TERMINAL AND RECORDING MEDIUM

(75) Inventors: Mitsuhiro Kitani, Tokyo (JP); Katsuya Miyata, Tokyo (JP)

(73) Assignee: NEC Casio Mobile Communications, Ltd., Kanagawa (JP)

( * ) Notice: Subject to any disclaimer, the term of this patent is extended or adjusted under 35 U.S.C. 154(b) by 0 days.

(21) Appl. No.: 13/034,330

(22) Filed: Feb. 24, 2011

(65) Prior Publication Data

US 2011/0207427 A1  Aug. 25, 2011

(30) Foreign Application Priority Data

Feb. 24, 2010  (JP) ................................ 2010-039366

(51) Int. Cl.
*H04W 36/00* (2009.01)

(52) U.S. Cl.
USPC ........................................................ 455/436

(58) Field of Classification Search
USPC .................... 455/127.4, 404.1, 436
See application file for complete search history.

(56) References Cited

U.S. PATENT DOCUMENTS

| | | | |
|---|---|---|---|
| 2006/0030290 A1* | 2/2006 | Rudolf et al. | 455/404.1 |
| 2006/0034228 A1* | 2/2006 | Kim et al. | 370/335 |
| 2007/0014261 A1* | 1/2007 | Lee | 370/331 |
| 2007/0049274 A1* | 3/2007 | Yacobi et al. | 455/436 |
| 2008/0102784 A1* | 5/2008 | Mittal et al. | 455/404.1 |
| 2009/0122788 A1 | 5/2009 | Ito | |

FOREIGN PATENT DOCUMENTS

| | | |
|---|---|---|
| CN | 1725901 | 1/2006 |
| CN | 101297578 | 10/2008 |
| JP | 2008-11239 | 1/2008 |

OTHER PUBLICATIONS

3GPP TS23.272 V8.6.0: Circuit Switched Fallback in Evolved Packet System: Stage 2 (Dec. 2009). 3rd Generation Partnership Project; Technical Specification Group Services and System Aspects; (Release 8).
Notice of Reasons for Rejection issued May 7, 2013 by the Japanese Patent Office in Japanese Patent Application No. 2010-039366 with partial translation, 9 pages.
Chinese Official Action—201110047450.2—Oct. 24, 2013.

* cited by examiner

*Primary Examiner* — Temica M Beamer
*Assistant Examiner* — Joel Ajayi
(74) *Attorney, Agent, or Firm* — Young & Thompson

(57) ABSTRACT

When a terminal-status detecting unit detects a predetermined terminal status with communication over a first mobile communication system being enabled by a first mobile communication unit, a control unit causes a second mobile communication system to start a process of acquiring a second mobile communication system to set communication via the second mobile communication system in an enabled status.

10 Claims, 10 Drawing Sheets

MOBILE COMMUNICATION TERMINAL AND RECORDING MEDIUM

This application is based on Japanese Patent Application No. 2010-039366 filed on Feb. 24, 2010, and including specification, claims, drawings and summary. The disclosure of the above Japanese Patent Application is incorporated herein by reference in its entirety.

TECHNICAL FIELD

The present invention relates to a mobile communication terminal and a recording medium, which are compatible with two or more mobile communication methods.

BACKGROUND ART

At present, development of LTE (Long Term Evolution) as a fast mobile communication method is underway. LTE uses a wide band of 20 MHz at a maximum, and adopts OFDMA (Orthogonal Frequency Division Multiple Access) and MIMO (Multiple Input Multiple Output) in down-link communication, and adopts SC-FDMA (Single-Carrier Frequency Division Multiple Access) in up-link communication. As a result, the LTE enables to achieve a transfer rate of 300 Mbps or higher at a maximum in down-link communication, and a transfer rate of 75 Mbps at a maximum in up-link communication.

LTE is a specialized communication method for packet communication. It is assumed that mobile communication terminals which can use LTE adopts the conventional communication methods, such as W-CDMA (Wideband Code Division Multiple Access) and cdma2000 1x for circuit-switched voice communication.

In this case, if a mobile communication terminal always stands by for both of a mobile communication system for voice communication and an LTE system, the current consumption in the normal standby of the mobile communication terminal increases, shortening the drive time of the terminal. If the mobile communication terminal stands by only for an LTE system, it cannot receive an incoming voice, and fails to effect a so-called "telephone" function. If the mobile communication terminal stands by only for a mobile communication system for voice communication, good use of the LTE's merit, full-time IP connection, cannot be made.

As a solution to those problems, the CS (Circuit Switched) Fallback function of the LTE system is described in "3GPP TS23.272 V8.6.0: Circuit Switched Fallback in Evolved Packet System; Stage 2" (hereinafter referred to as Non-patent Literature 1). In the CS Fallback function, a voice incoming notification from a mobile communication system for voice communication, such as W-CDMA or cdma2000 1x, is tunneled onto an LTE system to be transmitted to a mobile communication terminal. Then, the mobile communication terminal which has received the voice incoming notification performs a temporary disconnection (suspend) process on the LTE system, and performs circuit connecting process on the mobile communication system for voice communication to execute voice communication.

When voice communication is terminated later, the mobile communication terminal performs a circuit release process on the mobile communication system for voice communication, and performs a temporary-disconnection canceling (resume) process on the LTE system to return to standby for the LTE system. The same CS Fallback operation for the voice incoming process is carried out for a voice transmission process.

Since the mobile communication terminal in Non-patent Literature 1 normally stands by only for an LTE system, as mentioned above, the mobile communication terminal can have smaller current consumption than the type which stands by for both a mobile communication system for voice communication and LTE system.

In case of voice incoming, however, the mobile communication terminal in Non-patent Literature 1 needs to perform the temporary disconnection process for the LTE system and a process of acquiring the mobile communication system for voice communication while circuit connection is completed after reception of voice incoming notification from the LTE system. Therefore, the mobile communication terminal takes a longer time to actually start talking after reception of the voice incoming notification as compared with the mobile communication terminal which has finished the process of acquiring the mobile communication system for voice communication beforehand and is standing by in the standby state.

The same is true of the case of a transmission process; the mobile communication terminal in Non-patent Literature 1 needs to perform the temporary disconnection process for the LTE system and the process of acquiring the mobile communication system for voice communication while circuit connection is completed after the user performs the transmission process. Therefore, the mobile communication terminal in Non-patent Literature 1 takes a longer time to actually start talking after the user instructs voice transmission as compared with the mobile communication terminal which has finished the process of acquiring the mobile communication system for voice communication beforehand and is standing by in the standby state.

SUMMARY

Accordingly, it is an exemplary object of the present invention to provide a mobile communication terminal compatible with a plurality of communication methods and with improved user's operability, and a recording medium.

To achieve the exemplary object, according to a first exemplary aspect of the invention, there is provided a mobile communication terminal including:

a first mobile communication unit that performs communication via a first mobile communication system by a first mobile communication method;

a second mobile communication unit that performs communication via a second mobile communication system by a second mobile communication method;

a terminal-status detecting unit that detects a status of a mobile communication terminal; and a communication switching unit that causes the second mobile communication system to start a process of acquiring the second mobile communication system to set communication via the second mobile communication system in an enabled status, when the terminal-status detecting unit detects a predetermined terminal status with communication over the first mobile communication system being enabled by the first mobile communication unit.

To achieve the exemplary object, according to a second exemplary aspect of the invention, there is provided a computer readable recording medium recording a program that allows a computer to function as:

a first mobile communication unit that performs communication via a first mobile communication system by a first mobile communication method;

a second mobile communication unit that performs communication via a second mobile communication system by a second mobile communication method;

a terminal-status detecting unit that detects a status of a mobile communication terminal; and a communication switching unit that causes the second mobile communication system to start a process of acquiring the second mobile communication system to set communication via the second mobile communication system in an enabled status, when the terminal-status detecting unit detects a predetermined terminal status with communication over the first mobile communication system being enabled by the first mobile communication unit.

To achieve the exemplary object, according to a third exemplary aspect of the invention, there is provided a mobile communication terminal including:

a first mobile communication means that performs communication via a first mobile communication system by a first mobile communication method;

a second mobile communication means that performs communication via a second mobile communication system by a second mobile communication method;

a terminal-status detecting means that detects a status of a mobile communication terminal; and a communication switching means that causes the second mobile communication means to start a process of acquiring the second mobile communication system to set communication via the second mobile communication system in an enabled status, when the terminal-status detecting means detects a predetermined terminal status with communication over the first mobile communication system being enabled by the first mobile communication means.

BRIEF DESCRIPTION OF THE DRAWINGS

A more complete understanding of this application can be obtained when the following detailed description is considered in conjunction with the following drawings, in which.

EXEMPLARY EMBODIMENTS

Exemplary embodiments of the present invention will now be described with reference to the accompanying drawings.

(General System Configuration)

Figure 1:
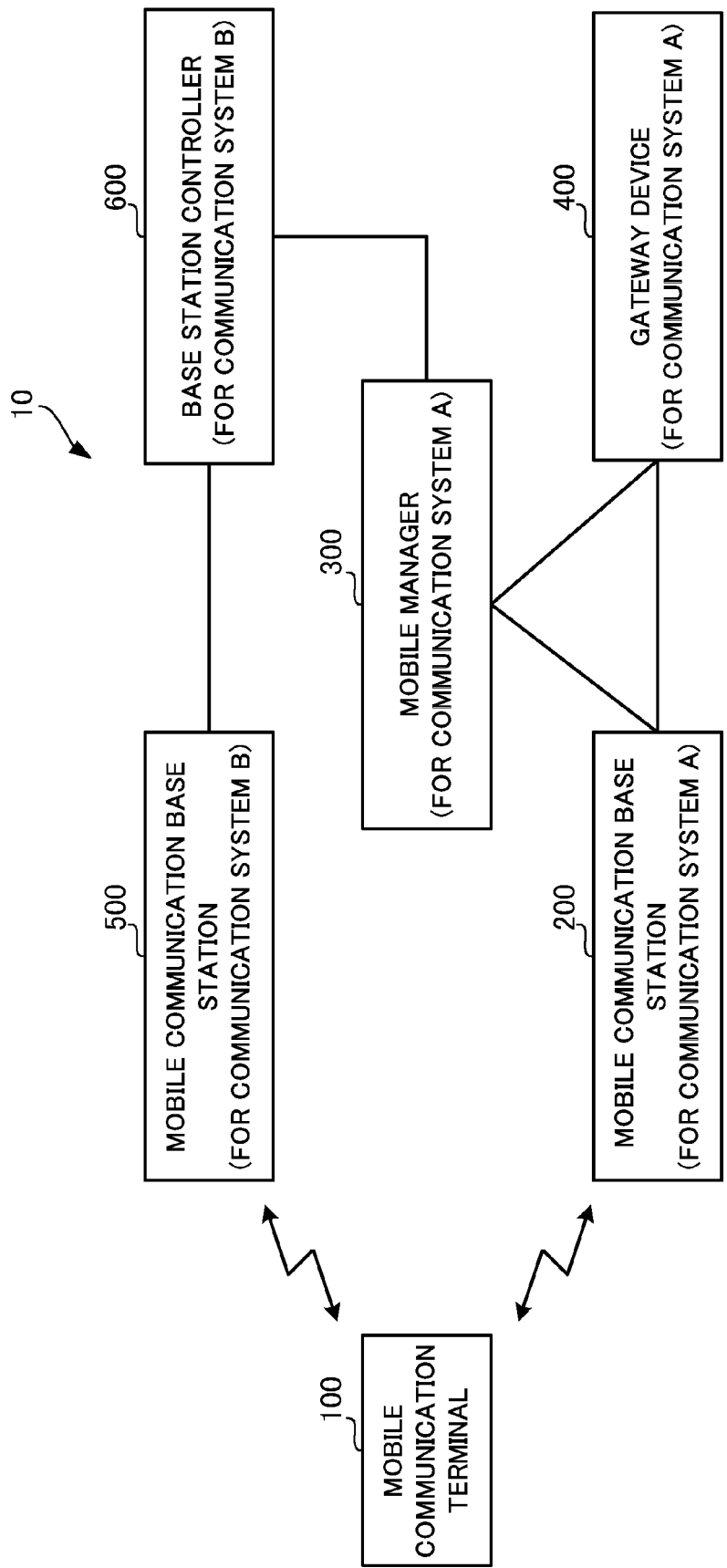
FIG. 1 is a diagram showing the configuration of a mobile communication system.

FIG. 1 is a configuration diagram of a mobile communication system 10 according to an embodiment of the invention. The mobile communication system 10 includes a mobile communication terminal 100, a mobile communication base station 200, a mobile manager 300, a gateway device 400, a mobile communication base station 500, and a base station controller 600.

The mobile communication base station 200, the mobile manager 300 and the gateway device 400 are network devices that constitute a first mobile communication system (called "mobile communication system A"). The communication method for the mobile communication system A is, for example, LTE, HSPA (High Speed Packet Access), WiMAX (Worldwide Interoperability for Microwave Access) or the like, and mainly provides a fast data communication service. The mobile communication system A may additionally include an authentication server, a subscriber information managing server, and a policy/charge control server, which are not illustrated.

The mobile communication base station 500 and the base station controller 600 are network devices that constitute a second mobile communication system (called "mobile communication system B"). The communication method for the mobile communication system B is, for example, W-CDMA, cdma2000, PHS (Personal Handy-phone System) or the like, and mainly provides a voice communication service. A communication method for the mobile communication system B provides a data communication service as well as the voice communication service in some cases. The mobile communication system B may additionally include an authentication server, a subscriber information managing server, and a policy/charge control server, which are not illustrated.

The mobile communication base station 200 carries out mobile communication with the mobile communication terminal 100 via a mobile communication interface. In case of the LTE system, for example, eNB (evolved Node B) is equivalent to the mobile communication base station 200.

The mobile manager 300 has functions of managing positional information of the mobile communication terminal 100, managing the sessions thereof, and managing a gateway device to which the mobile manager 300 is connected or the like. In case of the LTE system, for example, MME (Mobility Management Entity) is equivalent to the mobile manager 300.

The gateway device 400 has functions of transferring data communication traffics, and switching transfer paths in handover mode or the like. In case of the LTE system, for example, S-GW (Serving Gateway) is equivalent to the gateway device 400.

The mobile communication base station 500 carries out mobile communication with the mobile communication terminal 100 via a mobile communication interface. For example, Node B, BTS (Base Transceiver Station) or BS (Base Station) is equivalent to the mobile communication base station 500.

The base station controller 600 executes registration of the position of the mobile communication terminal 100, authentication thereof, calling/incoming process thereof, hand-over control thereof, etc. For example, RNC (Radio Network Control) or MSC (Mobile Switching Center) is equivalent to the base station controller 600.

As the base station controller 600 and the mobile manager 300 are connected together, the mobile communication system A and the mobile communication system B are connected together in interconnectivity. Although the base station controller 600 and the mobile manager 300 are directly connected to each other in FIG. 1, a unit, such as CS IWS (Circuit Switched fallback Interworking Solution function), may be intervened therebetween.

That is, the mobile communication terminal 100 of the invention is compatible at least with the mobile communication system A and the mobile communication system B, and is capable of mobile communicating the mobile communication base station 200 and the mobile communication base station 500.

(Fundamental Configuration of Mobile Communication Terminal)

Figure 2:
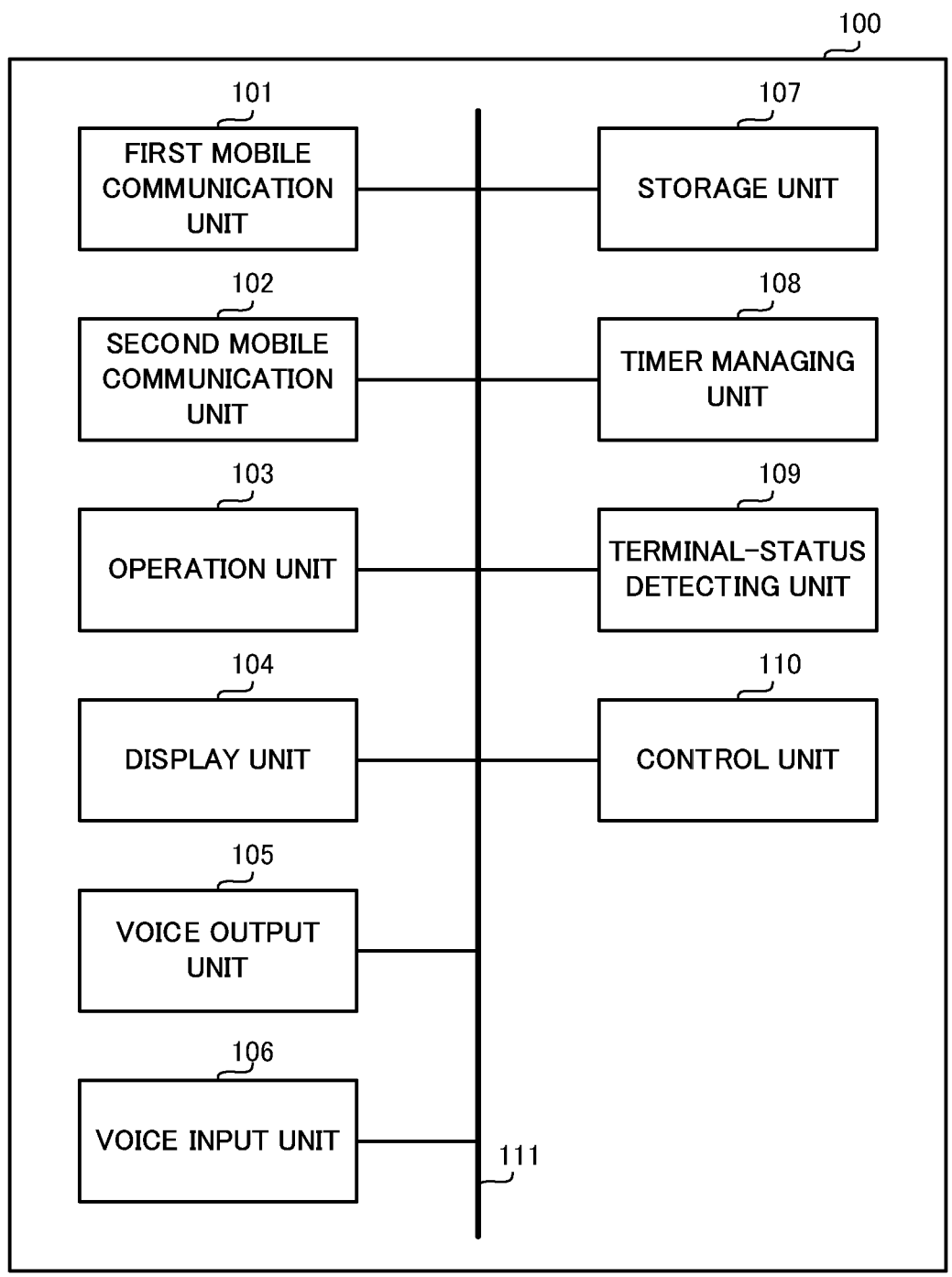
FIG. 2 is a diagram showing the functional configuration of a mobile communication terminal.

FIG. 2 is a diagram showing the functional configuration of the mobile communication terminal 100 according to the embodiment of the invention. The mobile communication terminal 100 includes a first mobile communication unit 101, a second mobile communication unit 102, an operation unit 103, a display unit 104, a voice output unit 105, a voice input unit 106, a storage unit 107, a timer managing unit 108, a terminal-status detecting unit 109, a control unit 110, and a bus 111. The mobile communication terminal 100 may include other units than those mentioned.

The first mobile communication unit 101 transmits and receives various kinds of data via the mobile communication base station 200. The first mobile communication unit 101 carries out mobile communication based on a first mobile communication method, such as LTE, HSPA, EV-DO or WiMAX.

The second mobile communication unit 102 performs voice talking and transmission and reception of various kinds of data via the mobile communication base station 500. The second mobile communication unit 102 mainly carries out voice communication based on a second mobile communication method, such as W-CDMA, cdma2000 1x or PHS.

The operation unit 103 is a user interface, such as a keyboard, cursor keys and ten keys, and accepts an operation made by a user and inputs an operation signal to the control unit 110.

The display unit 104 includes a display panel like a dot matrix type LCD (Liquid Crystal Display) panel, and a driver circuit, and displays arbitrary data (e.g., characters, image, video, etc.) under control of the control unit 110.

The voice output unit 105 includes a speaker and a DAC (Digital Analog Converter), and performs DA conversion on a voice signal received from, for example, the second mobile communication unit 102 and generates the voice signal from the speaker.

The voice input unit 106 includes a microphone and an ADC (Analog Digital Converter), and, at the time of talking, collects voices, performs AD conversion thereon, and supplies a voice signal to the second mobile communication unit 102.

The storage unit 107 includes a memory built in the mobile communication terminal 100 and a detachable external memory, and stores various kinds of data. For example, the storage unit 107 stores an operation control program which is executed by the control unit 110.

The timer managing unit 108 includes a software time, for example, and measures the time elapsed from a certain point of time and determines whether a predetermined time has elapsed.

The terminal-status detecting unit 109 discriminates the activation statuses of various applications which the mobile communication terminal 100 includes, and determines whether emergency call information is received from the mobile communication base station 500 or a digital broadcasting station. The emergency call information is information indicating an emergency flash report from ETWS (Earthquake Tsunami Warning Systems) of the mobile communication system A, an emergency earthquake flash report or an emergency flash report from the mobile communication system B, a digitally-broadcast emergency flash report on EWS (Emergency Warning System) of one-segment broadcasting, or the like.

The control unit 110 comprises a microprocessor unit, etc., and controls the overall operation of the mobile communication terminal 100.

The bus 111 transfers data among the individual units.

(Flow of CSFB Process)

Figure 3:
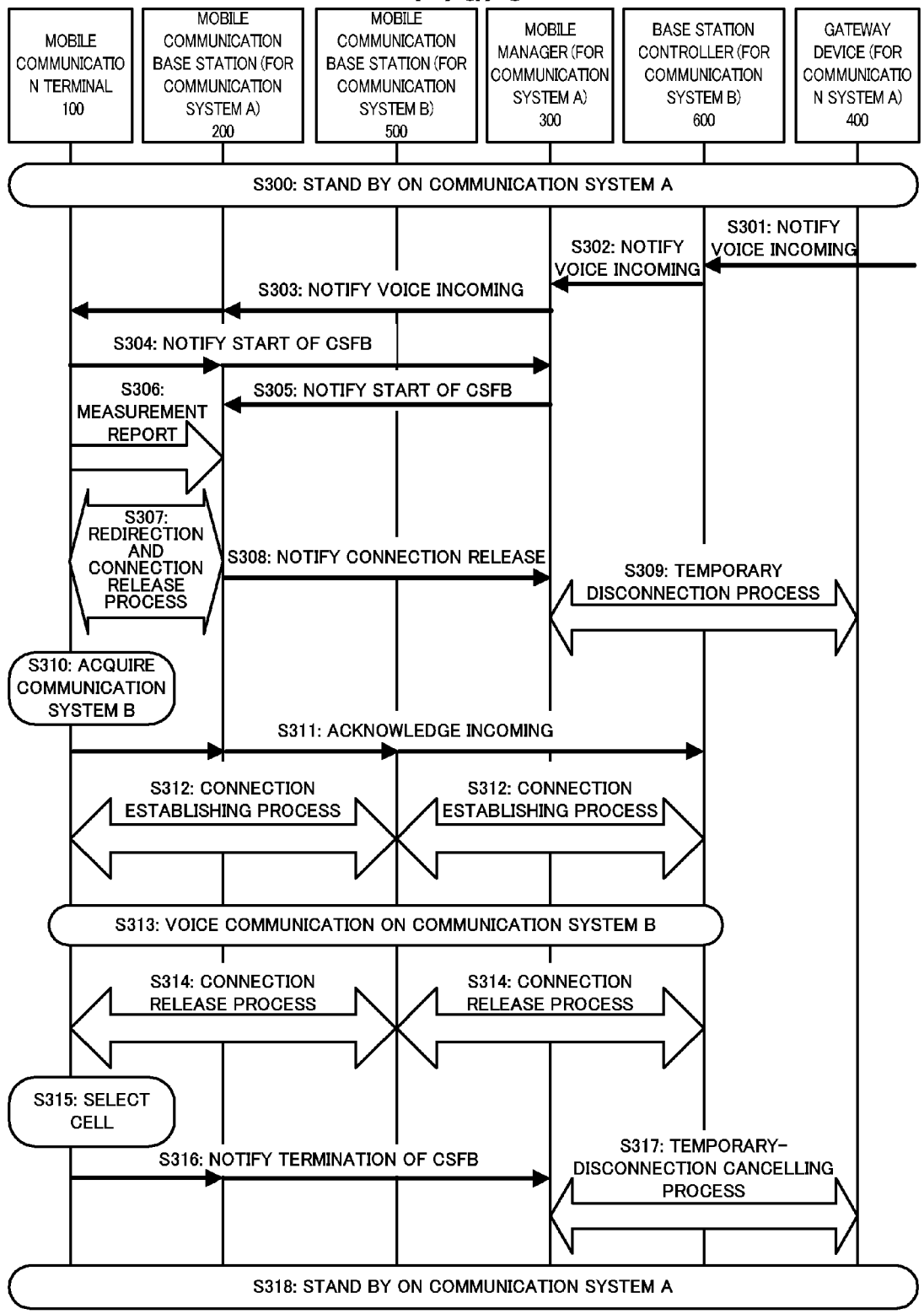
FIG. 3 is a diagram illustrating the process flow of a CSFB process.

Next, referring to FIG. 3, the operation of the CS Fallback (hereinafter called "CSFB") function will be described. As the initial state, the mobile communication terminal 100 is standing by for the mobile communication system A (step S300).

The standby state is a so-called "camp on" state where the mobile communication terminal 100 has completed a synchronization process for a mobile communication base station which belongs to the mobile communication system A, and has received system information on the mobile communication system A.

Further, in the standby state, the mobile communication terminal 100 requests the network device (mobile manager 300 or gateway device 400) of the mobile communication system A for establishment or the like of position registration, session or bearer in some case. The mobile communication terminal 100 standing by for the mobile communication system A has merits such that the activation time for data communication becomes quicker and a service for the mobile communication terminal 100 can be activated by the network side.

When voice transmission process to the mobile communication terminal 100 is performed by a communication counterpart (not shown) in the state of step S300, a voice incoming notification addressed to the mobile communication terminal 100 is transmitted to the base station controller 600 of the mobile communication system B (step S301).

The base station controller 600 transmits the voice incoming notification addressed to the mobile communication terminal 100 to the mobile manager 300 of the mobile communication system A (step S302).

The mobile manager 300 transmits the voice incoming notification addressed to the mobile communication terminal 100 to the mobile communication terminal 100 via the mobile communication base station 200 (step S303). In steps S302 and S303, the voice incoming notification for the mobile communication system B is transmitted to be written on a control message for the mobile communication system A by tunneling.

The mobile communication terminal 100 which has received the voice incoming notification transmits a CSFB start notification to the mobile manager 300 via the mobile communication base station 200 (step S304). The mobile manager 300 transmits the CSFB start notification to the mobile communication base station 200 (step S305).

The mobile communication terminal 100 periodically measures information indicative of the reception status, and reports the result to the mobile communication base station 200 (step S306). The information indicative of the reception status includes RSSI (Received Signal Strength Indicator), RSRP (Reference Signal Received Power) and RSRQ (Reference Signal Received Quality). Although reporting on the measuring result is basically performed constantly regardless of the presence or absence of a voice incoming notification, it may be initiated upon reception of the voice incoming notification.

The mobile communication base station 200 which has received the report on the measuring result transmitted by the mobile communication terminal 100 gives an instruction on a redirection destination and redirection timing to the mobile communication terminal 100, and activates a connection release process (step S307). The redirection destination and redirection timing should be decided by the mobile communication base station 200 according to the contents of the report. In the connection release process, each of the mobile communication terminal 100 and the mobile communication base station 200 releases a wireless resource secured to perform mobile communication therebetween, and deletes related management information or the like. In the connection release process, if necessary, the mobile communication terminal 100 and the mobile communication base station 200 transmit/receive a control message to/from each other.

When the connection release process is completed, the mobile communication base station 200 transmits a connection release notification to the mobile manager 300 (step S308).

The mobile manager 300 which has received the connection release notification performs a temporary disconnection (suspend) process with respect to the gateway device 400 (step S309). In the temporary disconnection process, the mobile manager 300 and the gateway device 400 partially release communication resources secured for transmission of data addressed to the mobile communication terminal 100, or suspend the communication resources, or partially delete related management information. In the temporary disconnection process, if necessary, the mobile manager 300 and the gateway device 400 transmit/receive a control message to/from each other. In addition, in the temporary disconnection process, a function of buffering data addressed to the mobile communication terminal 100 may be enabled. In any way, as the communication resources and management information are not entire released or entirely deleted, communication can be resumed quickly in a later temporary-disconnection cancelling process.

The mobile communication terminal 100 which has performed the connection release process in step S307 carries out a process of acquiring the mobile communication system B (step S310). At this time, the mobile communication terminal 100 searches for a communicable base station in the mobile communication system B or follows the redirection instruction in step S307 to decide the mobile communication base station 500 to be acquired.

Then, the mobile communication terminal 100 transmits an incoming acknowledgement to the acquired mobile communication base station 500 of the mobile communication system B (step S311), and performs a connection establishment process (step S312). The mobile communication base station 500 performs a incoming acknowledgement process and a connection establishment process with respect to the base station controller 600 (steps S311 and S312).

When the processes of steps S311 and S312 are completed, the mobile communication terminal 100 enables voice talking on the mobile communication system B (step S313).

When voice talking is completed, the mobile communication terminal 100 performs the connection release process with respect to the mobile communication base station 500 to cancel the standby state of the mobile communication system B (step S314). In addition, the mobile communication base station 500 performs the connection release process with respect to the base station controller 600 (step S314). The mobile communication system B basically has communication resources which are needed by the mobile communication base station 500 and the base station controller 600 in connection with the state of wireless resources secured between the mobile communication terminal 100 and the mobile communication base station 500. Accordingly, the mobile communication system B basically does not have a capability of performing the temporary disconnection process or the temporary-disconnection canceling process of leaving the communication resources only in the mobile communication base station 500 or the base station controller 600.

The mobile communication terminal 100 which has completed the connection release process searches the mobile communication base stations 200 (cells) using the mobile communication system A to select a mobile communication base station to communicate with (step S315). The mobile communication terminal 100 transmits a CSFB termination notification to the mobile manager 300 via the selected mobile communication base station 200 (step S316).

The mobile manager 300 which has received the CSFB termination notification performs a temporary-disconnection canceling (resume) process with respect to the gateway device 400 (step S317). In the temporary-disconnection cancelling process, the mobile manager 300 and the gateway device 400 re-secure or resume the communication resources that have been released partially or suspended in step S317, or re-establish management information that has been deleted partially. In the temporary-disconnection canceling process, if necessary, the mobile manager 300 and the gateway device 400 transmit/receive a control message to/from each other. In addition, in the temporary-disconnection canceling process, transmission of the buffered data, addressed to the mobile communication terminal 100, to the mobile communication terminal 100 may be started. In any way, in the resume process the process of securing the communication resources or the process of establishing the management information is not carried out from the beginning, the communication can be resumed quickly. When the temporary-disconnection canceling process is completed, the mobile communication terminal 100 stands by for the mobile communication system A (step S318).

The above is the flow of the CSFB process in voice incoming mode. The flow of the CSFB process in voice transmission mode is the same as the CSFB process in voice incoming mode in performing the temporary disconnection process with respect to the gateway device 400 before acquiring the mobile communication system B (step S309) and reacquiring the mobile communication system A and performing the temporary-disconnection canceling process with respect to the gateway device 400 (step S317) after voice transmission in the mobile communication system B is terminated.

First Embodiment

Figure 4:
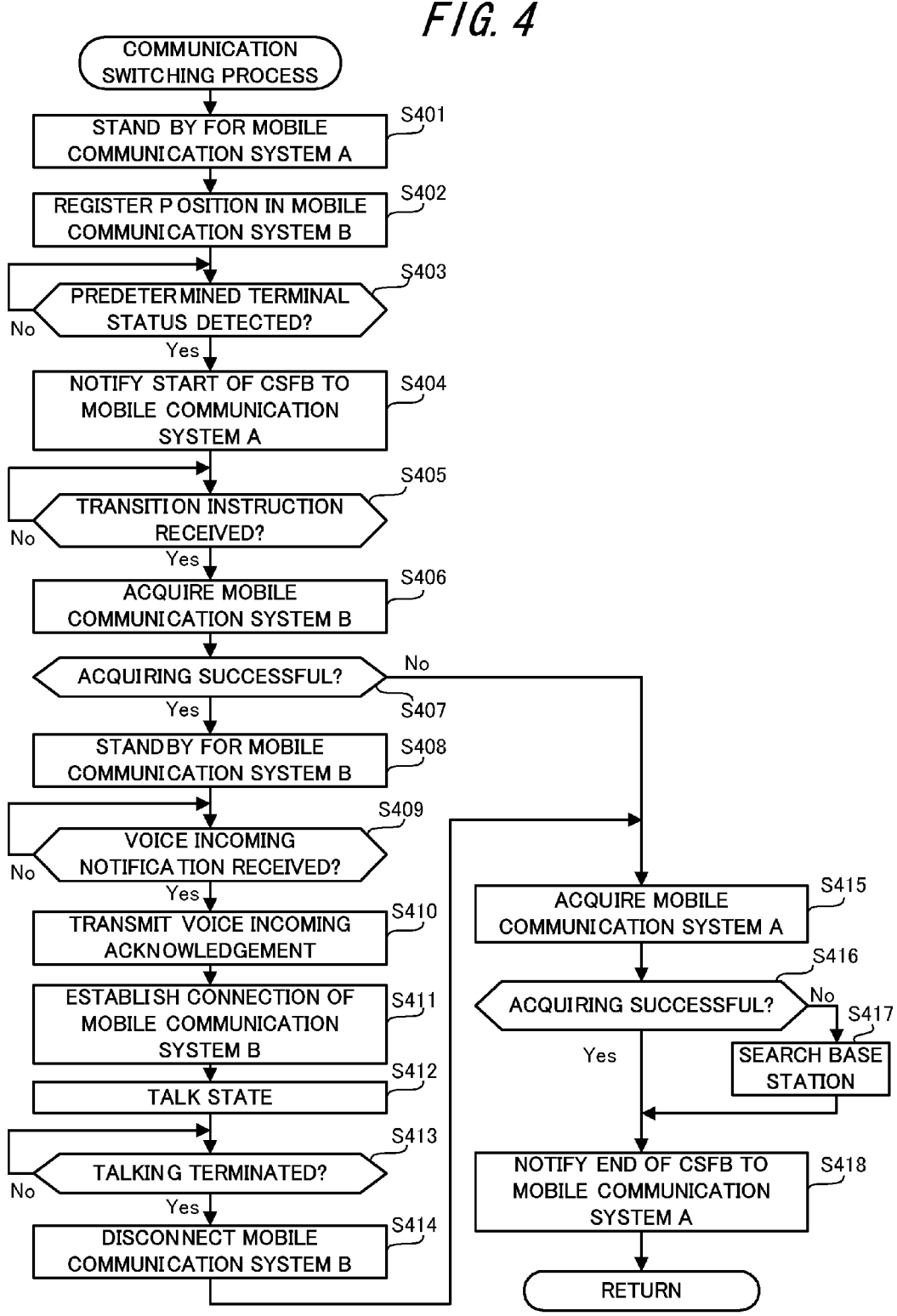
FIG. 4 is a flowchart illustrating the operation of a communication switching process (first embodiment)

Next, the operation of the mobile communication terminal 100 according to the first embodiment of the invention will be described. FIG. 4 is a flowchart illustrating the operation of a communication switching process starting from power-ON of the mobile communication terminal 100, then execution of voice talking in response to voice incoming, and standby for voice incoming after termination of the voice talking.

After powered on, the mobile communication terminal 100 carries out a part of the process of performing voice communication (canceling the standby for the mobile communication system A and the standby process for the mobile communication system B) beforehand when the mobile communication terminal 100 detects a predetermined terminal status, such as reception of an emergency call from a cellular phone base station or a digital broadcasting station, so that it is predicted to have an incoming voice within a given time. Accordingly, when a voice incoming event occurs later, the mobile communication terminal 100 can shorten the time to start voice communication. The details of the operation will be given below.

When the mobile communication terminal 100 is powered on, the mobile communication terminal 100 acquires the mobile communication system A and stands by for the mobile communication system A (step S401). Specifically, the control unit 110 enables communication of the first mobile communication unit 101. At this time, the control unit 110 does not perform the process of acquiring the mobile communication system B or the process of measuring the reception status of the mobile communication system B. It is assumed that the following operation of the mobile communication terminal 100 is carried out under control of the control unit 110.

Subsequently, the mobile communication terminal 100 registers the position of the mobile communication terminal 100 in the mobile communication system B via the mobile communication system A (step S402), and then shifts to a state of standing by for detection of a predetermined terminal status (step S403).

When detecting the predetermined terminal status after step S402 (step S403; Yes), the mobile communication terminal 100 transmits the CSFB start notification to the mobile communication system A (step S404). The details of the predetermined terminal status will be described later.

After transmitting the CSFB start notification in step S404, the mobile communication terminal 100 waits for reception of an instruction for transition to the mobile communication system B (step S405). This process is equivalent to the instruction in step S307 in FIG. 3. Upon reception of the instruction for transition to the mobile communication system B (step S405; Yes), the mobile communication terminal 100 performs the process of acquiring the mobile communication system B (step S406). This process is equivalent to step S310 in FIG. 3.

When acquiring of the mobile communication system B is successful (step S407; Yes), the mobile communication terminal 100 goes to the state of standing by for the mobile communication system B (step S408). This state is equivalent to step S310 in FIG. 3. When acquiring of the mobile communication system B fails (step S407; No), on the other hand, the process goes to step S415 to be described later to acquire the mobile communication system A.

After step S408, the mobile communication terminal 100 goes to the state of standing by for reception of the voice incoming notification (step S409).

Upon reception of the voice incoming notification in the standby for the voice incoming notification (step S409; Yes), the mobile communication terminal 100 returns an acknowledgment of the voice incoming notification (step S410), and performs the process of establishing connection of the mobile communication system B (step S411).

Subsequently, the mobile communication terminal 100 goes to a voice talkable state (talking state) on the mobile communication system B (step S412). This state is equivalent to step S313 in FIG. 3.

When the voice talking on the mobile communication system B ends (step S413; Yes), the mobile communication terminal 100 performs the connection release process of the mobile communication system B, and cancels the standby state for the mobile communication system B (step S414). Then, the mobile communication terminal 100 performs the process of acquiring the mobile communication system A (step S415).

When acquiring of the mobile communication system A is successful (step S416; Yes), the mobile communication terminal 100 transmits the CSFB termination notification to the mobile communication base station 200 (step S418). This process is equivalent to step S316 in FIG. 3. When the above processing is completed, the mobile communication terminal 100 returns to the standby state for the mobile communication system A (step S401). This is equivalent to step S318 in FIG. 3.

When acquiring of a mobile communication base station 200 of the mobile communication system A fails (step S416; No), the mobile communication terminal 100 searches the mobile communication base stations 200 of the mobile communication system A (step S417). If the mobile communication terminal 100 can acquire the mobile communication system A, the mobile communication terminal 100 transmits the CSFB termination notification to the mobile communication base station 200 (step S418), then returns to the state of step S401. When the mobile communication terminal 100 cannot acquire the mobile communication system A, the mobile communication terminal 100 should perform the process of acquiring the mobile communication system B, or perform a predetermined operation in case of the out of service.

When the mobile communication terminal 100 detects a predetermined terminal status (step S403; Yes), as apparent from the above, the mobile communication terminal 100 predicts that an incoming voice will be received within a given time, and performs the processes of steps S404 to S408 which should be carried out after reception of a voice incoming notification before going to the state of standing by for a voice incoming notification (step S409). Accordingly, when a voice incoming notification actually arrives later, the voice talking can be started immediately.

The predetermined terminal status which is detected in step S403 is the status where a service, such as an emergency flash report generated by the ETWS of the mobile communication system A, an emergency earthquake flash report or an emergency call from the mobile communication system B, or a digitally-broadcast emergency flash report on EWS of one-segment broadcasting, is received.

Figure 8:
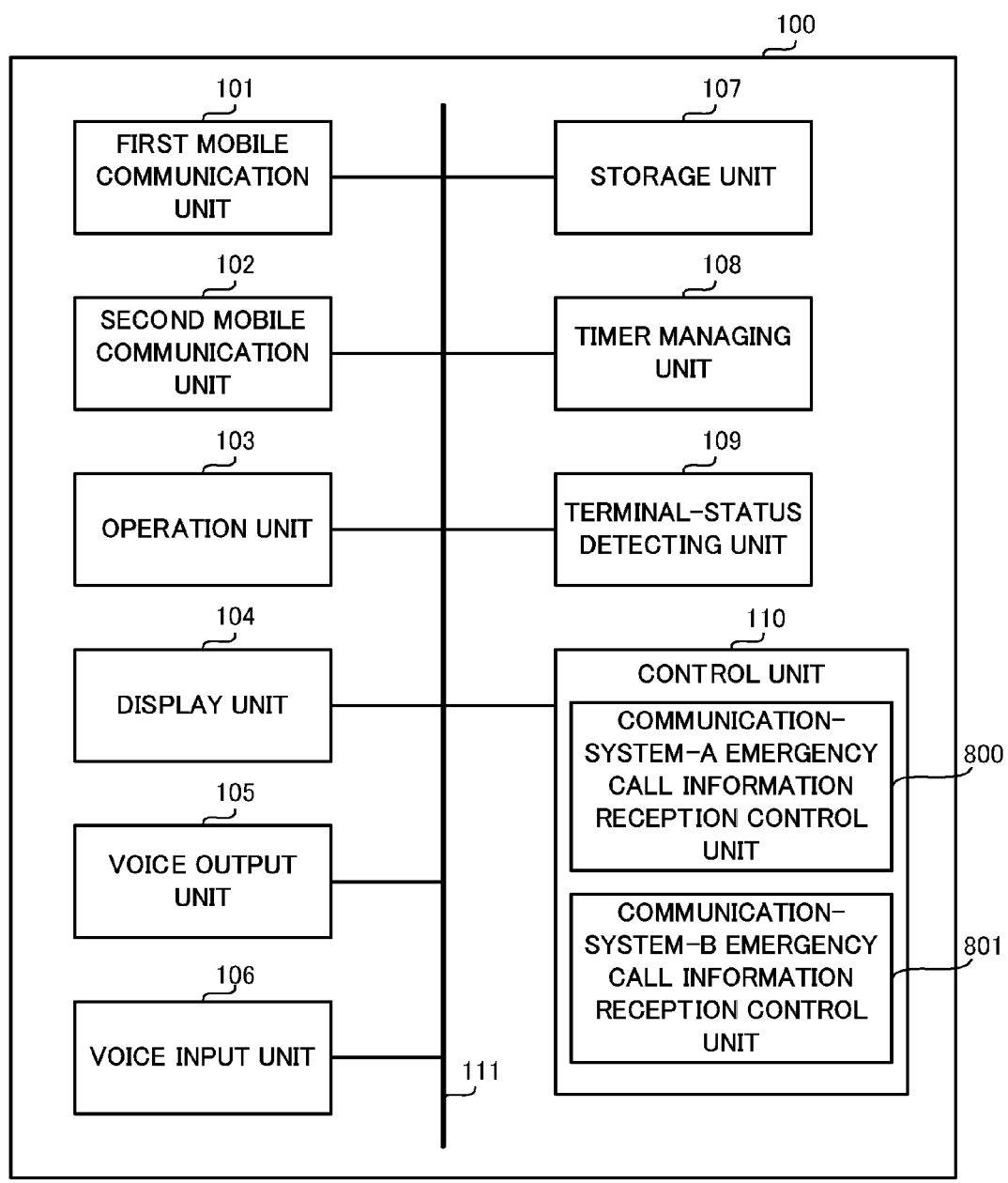
FIG. 8 is a diagram exemplifying the functional configuration of the mobile communication terminal.

FIG. 8 shows a functional configuration diagram of the mobile communication terminal 100 to detect reception of an emergency flash report generated by the ETWS of the mobile communication system A, or an emergency flash report from the mobile communication system B.

In this case, the mobile communication terminal 100 is configured to additionally have, in the control unit 110 of the mobile communication terminal 100 shown in FIG. 1, a communication-system-A emergency call information reception control unit 800 for controlling reception of an emergency flash report generated by the ETWS of the mobile communication system A, and a communication-system-B emergency call information reception control unit 801 for controlling reception of an emergency flash report from the mobile communication system B.

This configuration allows the terminal-status detecting unit 109 to detect that the communication-system-A emergency call information reception control unit 800 has received ETWS-originated emergency flash report via the first mobile communication unit 101, or that the communication-system-B emergency call information reception control unit 801 has received an emergency earthquake flash report or an emergency flash report generated by the mobile communication system B, via the second mobile communication unit 102.

As the mobile communication terminal 100 is configured as shown in FIG. 8, when the terminal-status detecting unit 109 detects reception of an emergency flash report, the mobile communication terminal 100 predicts that an incoming voice will be received within a given time, and can go to the state of standing by for a voice incoming notification. Accordingly, upon reception of the voice incoming notification thereafter, the mobile communication terminal 100 can start voice talking immediately.

The mobile communication terminal 100 may be configured to have one of the communication-system-A emergency call information reception control unit 800 and the communication-system-B emergency call information reception control unit 801 added to the control unit 110.

Figure 9:
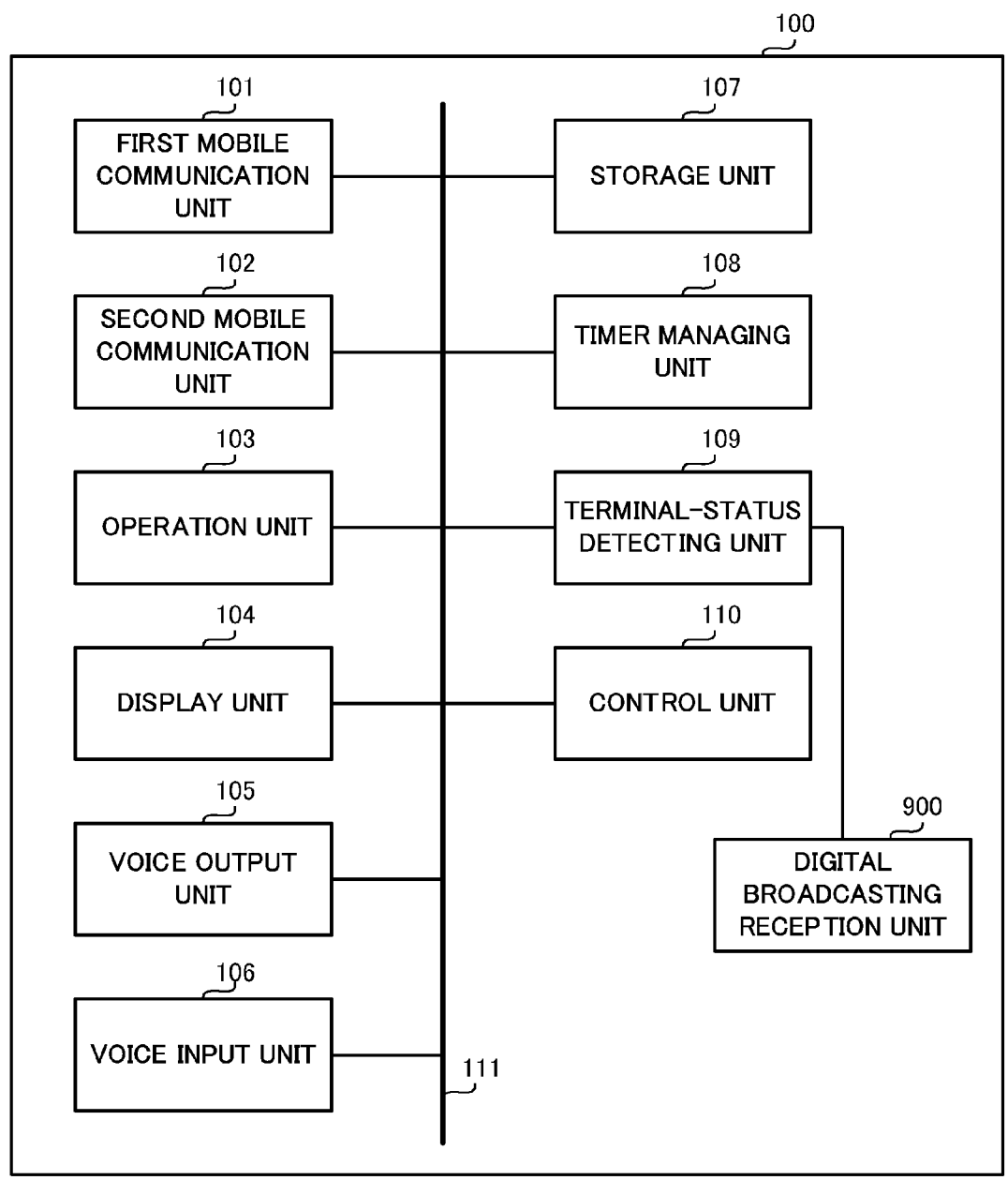
FIG. 9 is a diagram exemplifying the functional configuration of the mobile communication terminal.

FIG. 9 shows a functional configuration diagram of the mobile communication terminal 100 to detect reception of an emergency flash report digitally broadcast by the EWS or the one segment or the like.

In this case, the mobile communication terminal 100 is configured to have a digital broadcasting reception unit 900 newly added to the configuration of the mobile communication terminal 100 shown in FIG. 1 to receive a digitally-broadcast emergency flash report.

This configuration allows the terminal-status detecting unit 109 to detect that the digital broadcasting reception unit 900 has received digitally-broadcast emergency flash report information generated by the EWS of one segment or the like.

As the mobile communication terminal 100 is configured as shown in FIG. 9, when the terminal-status detecting unit 109 detects reception of digitally-broadcast emergency flash report information, the mobile communication terminal 100 predicts that an incoming voice will be received within a given time, and can go to the state of standing by for a voice incoming notification. Accordingly, upon reception of the voice incoming notification thereafter, the mobile communication terminal 100 can start voice talking immediately.

The invention can obtain similar effects at the time of carrying out the voice transmission process as well as at the time of carrying out the voice incoming process. When a predetermined terminal status is detected while the mobile communication terminal 100 carries out the voice transmission process after being powered on, the mobile communication terminal 100 predicts that an incoming voice will be received within a given time. As the mobile communication terminal 100 performs a part of the process of carrying out voice communication (steps S404 to S408) beforehand, the mobile communication terminal 100 can start voice talking immediately when the mobile communication terminal 100 receives a voice transmission event from the user later.

The predetermined terminal status which is detected in step S403 may be the "state where a predetermined application installed in the mobile communication terminal 100 is activated" added to the aforementioned status in the case of the voice incoming process.

Figure 10:
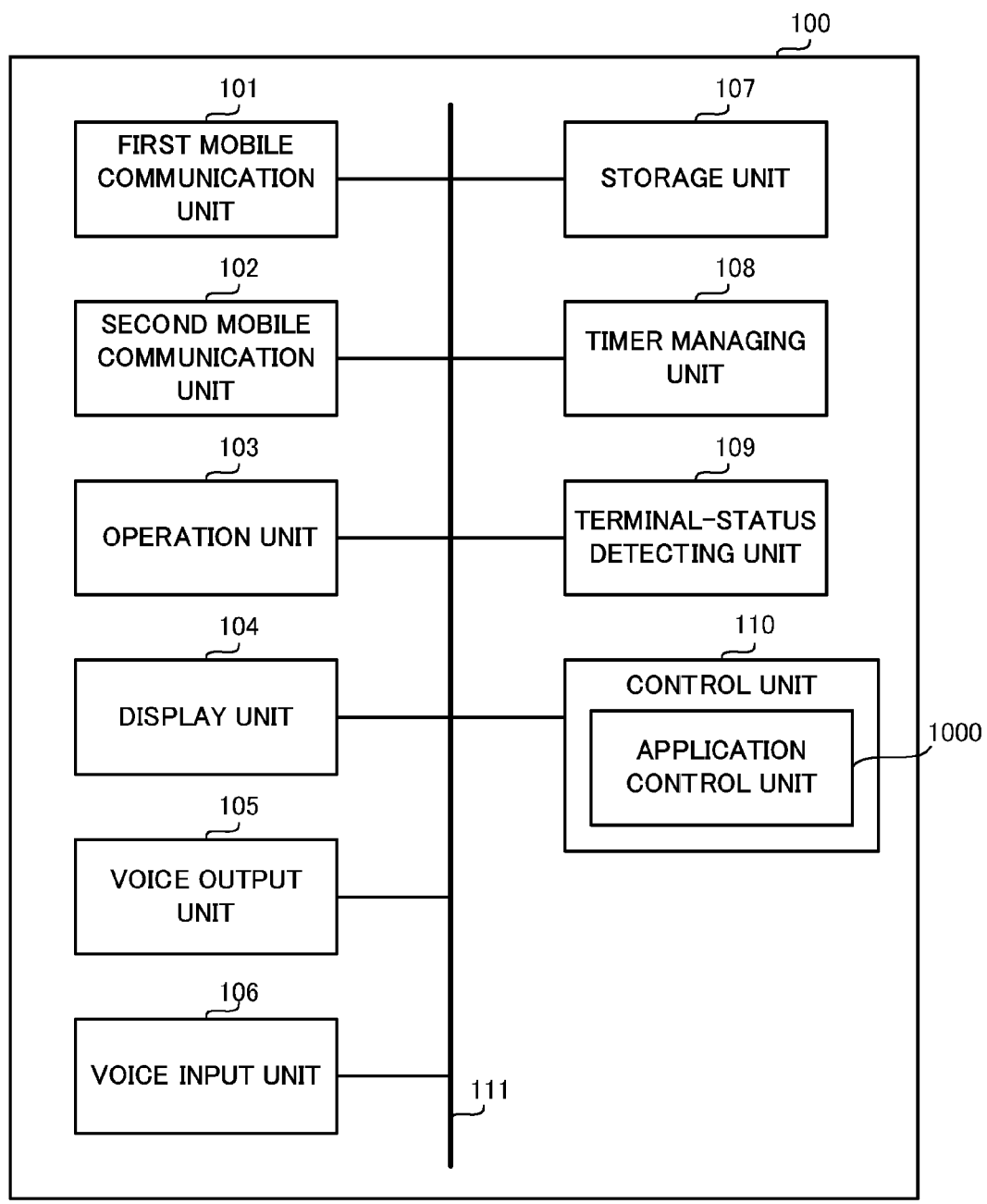
FIG. 10 is a diagram exemplifying the functional configuration of the mobile communication terminal.

The predetermined application is associated with voice talking (voice communication), such as an address book, a telephone-number input screen display function, or a transmission/reception-history screen display function. In the telephone-number input screen display function, not only activation of this function (telephone-number input screen) but also a sequence of operations up to the entry of a telephone number for an emergency call may be detected. When detecting activation of an application associated with voice communication, the mobile communication terminal 100 predicts that the user will perform a voice transmission process within a given time, and promptly goes to the state of standing by for the mobile communication system B. As a result, when the user performs a transmission operation later, the mobile communication terminal 100 can start voice talking immediately, thereby improving the usability of the user. FIG. 10 shows a functional configuration diagram of the mobile communication terminal to detect activation of an application associated with voice communication.

In this case, the mobile communication terminal 100 has an application control unit 1000 in the control unit 110 of the mobile communication terminal 100 shown in FIG. 1.

With this configuration, the terminal-status detecting unit 109 acquires information indicating whether each application is activated by the application control unit 1000 to detect if the aforementioned application (e.g., application associated with the voice communication) is activated.

When detecting activation of an application associated with voice communication, the mobile communication terminal 100 predicts that a voice transmission event will occur within a given time, and can go to the state of standing by for reception of the voice transmission event. When the voice transmission event is received later, therefore, voice talking can be started immediately.

Figure 5:
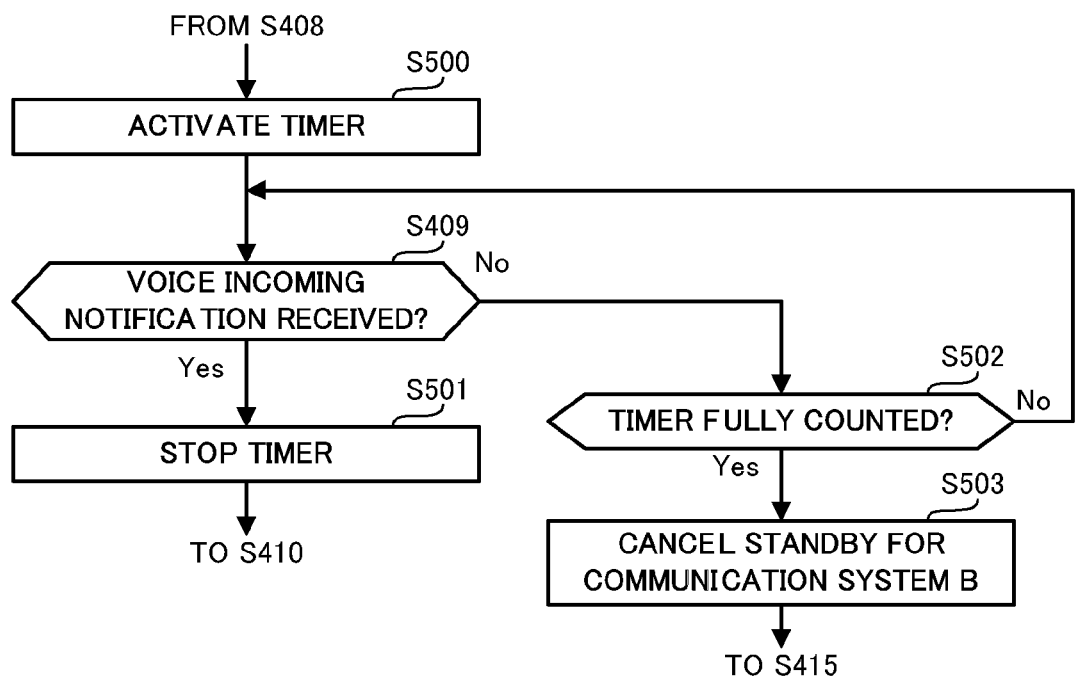
FIG. 5 is a flowchart illustrating the operation of a communication switching process (modification of the first embodiment)

The operation of the first embodiment may be modified as follows. FIG. 5 is a flowchart illustrating the operation of a modification of the communication switching process according to the first embodiment. In this modification, the mobile communication terminal 100 predicts occurrence of a voice incoming event or a voice transmission event and starts CSFB on the mobile communication system A, and cancels the CSFB on the mobile communication system A when the voice incoming event or voice transmission event is not generated within a given time. Same reference numerals are given to those processes which are the same as the corresponding processes in FIG. 4 to omit their redundant descriptions.

After the status becomes the standby state for the mobile communication system B in step S408, the mobile communication terminal 100 activates a timer (step S500).

Then, the mobile communication terminal 100 stands by for reception of a voice incoming notification (step S409), and, upon reception of the voice incoming notification (step S409; Yes), stops the timer (step S501) and transmits a voice incoming acknowledgement (step S410). When the mobile communication terminal 100 does not receive the voice incoming notification (step S409; No), on the other hand, the mobile communication terminal 100 discriminates if the timer has counted fully (step S502). When the timer has not counted fully (step S502; No), the mobile communication terminal 100 stands by for reception of a voice incoming notification again (step S409). When the timer has counted fully (step S502; Yes), the mobile communication terminal 100 cancels the standby for reception of the mobile communication system B (step S503) to acquire the mobile communication system A (step S415).

Through the above processing, when a voice transmission/incoming process is not carried out for a predetermined time, the mobile communication terminal 100 cancels a CSFB and returns to the standby state for the mobile communication system A, thus making it possible to perform fast data transmission/reception using the mobile communication system A and prevent deterioration of the convenience to users.

When the timer has not counted fully (step S502; No) in FIG. 5, the terminal-status detecting unit 109 may discriminate whether a predetermined application installed in the mobile communication terminal 100 is activated. When the predetermined application is not activated, the mobile communication terminal 100 goes to step S409 to stand by for reception of a voice incoming notification. When the predetermined application is activated, on the other hand, the mobile communication terminal 100 goes to step S503 to cancel the standby state for the mobile communication system B and acquire the mobile communication system A (step S415).

The predetermined application is an application which is not associated with the voice communication, such as a camera application, a TV application, a browser application, or a mail application.

As apparent from the above, when an application which is not associated with the voice communication is activated even before the predetermined time elapses, the terminal status is set back to the standby state for the mobile communication system A, so that data communication using the mobile communication system A can be activated quickly when the possibility of the user's executing a transmission operation becomes lower. The usability can therefore be improved.

The timer may be set to be N times the incoming period (wireless frame including a Paging timing) of the LTE where N is an arbitrary integer. With this setting, it is possible to avoid standing by in the mobile communication system B in a wireless frame zone where an incoming timing does not lie.

Second Embodiment

Figure 6:
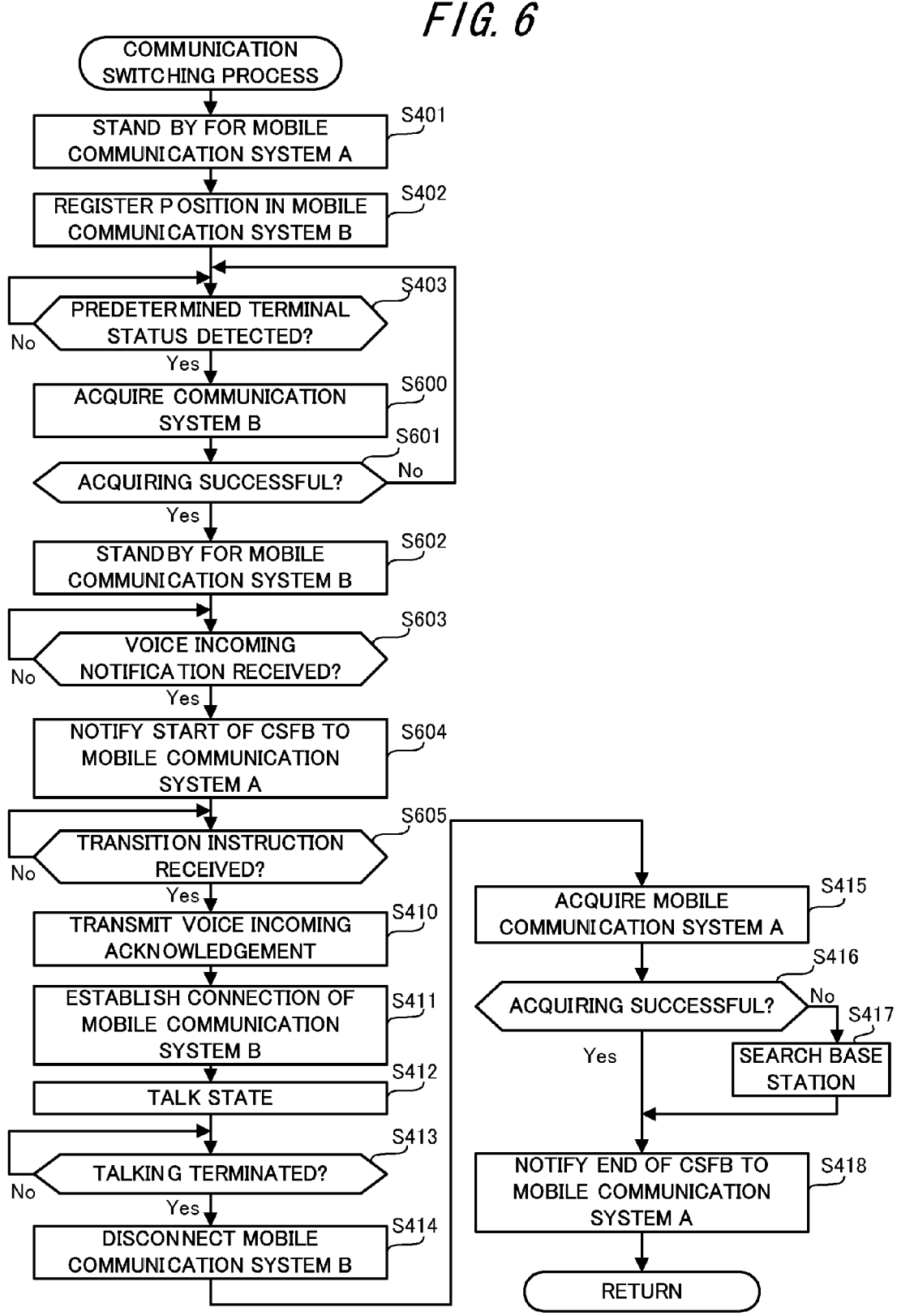
FIG. 6 is a flowchart illustrating the operation of a communication switching process (second embodiment)

Next, the operation of a mobile communication terminal 100 according to the second embodiment of the invention will be described. FIG. 6 is a flowchart illustrating the operation of the communication switching process that is executed by the mobile communication terminal 100 of the second embodiment. Same reference numerals are given to those processes in FIG. 6 which are the same as the corresponding processes in FIG. 4 to omit their descriptions. The basic configuration of the mobile communication terminal 100 of the second embodiment is the same as those shown in FIGS. 2, 8, 9 and 10.

The operation from the power-ON of the mobile communication terminal 100 up to transition to the standby state for detection of a predetermined terminal status (step S403) is the same as the one shown in FIG. 4.

When the predetermined terminal status is detected in step S403 (step S403; Yes), the mobile communication terminal 100 performs the process of acquiring the mobile communication system B (step S600). The predetermined terminal status is the same as the one described in the description of the first embodiment.

When the mobile communication terminal 100 succeeds to acquire the mobile communication system B (step S601; Yes), the mobile communication terminal 100 stands by for the mobile communication system B (step S602). When the mobile communication terminal 100 fails to acquire the mobile communication system B (step S601; No), on the other hand, the mobile communication terminal 100 goes to the state of standing by for detection of the predetermined terminal status again (step S403).

When detecting a voice incoming notification after step S602 (step S603; yes), the mobile communication terminal 100 transmits a CSFB start notification to the mobile communication system A (step S604). After transmitting the CSFB start notification in S604, the mobile communication terminal 100 stands by for reception of an instruction to shift to the mobile communication system B (step S605).

Upon reception of an instruction to shift to the mobile communication system B (step S605; Yes), the mobile communication terminal 100 returns an acknowledgment of the voice incoming notification (step S410), and performs the process of establishing connection of the mobile communication system B (step S411). Since the subsequent processes are the same as those shown in FIG. 4, their descriptions will be omitted.

As apparent from the above, in the communication switching process according to the second embodiment, the mobile communication terminal 100 detects a predetermined terminal status (step S403; Yes), and then performs, in advance, the process of acquiring the mobile communication system B (processes of steps S600 to S602) which is a part of the process that should be performed after reception of a voice incoming notification before transmits the CSFB start notification to the mobile communication system A. Then, the mobile communication terminal 100 goes to the standby state for the voice incoming notification (step S603). When there is an incoming voice later, therefore, voice talking can be started immediately. When the mobile communication system B cannot be acquired (step S601; No), the mobile communication terminal 100 does not transmit the CSFB start notification to the mobile communication system A, the standby state for the mobile communication system A can be maintained, eliminating wasteful communication.

The same processes which are performed for the voice incoming process can be carried out for the voice transmission process as well.

Figure 7:
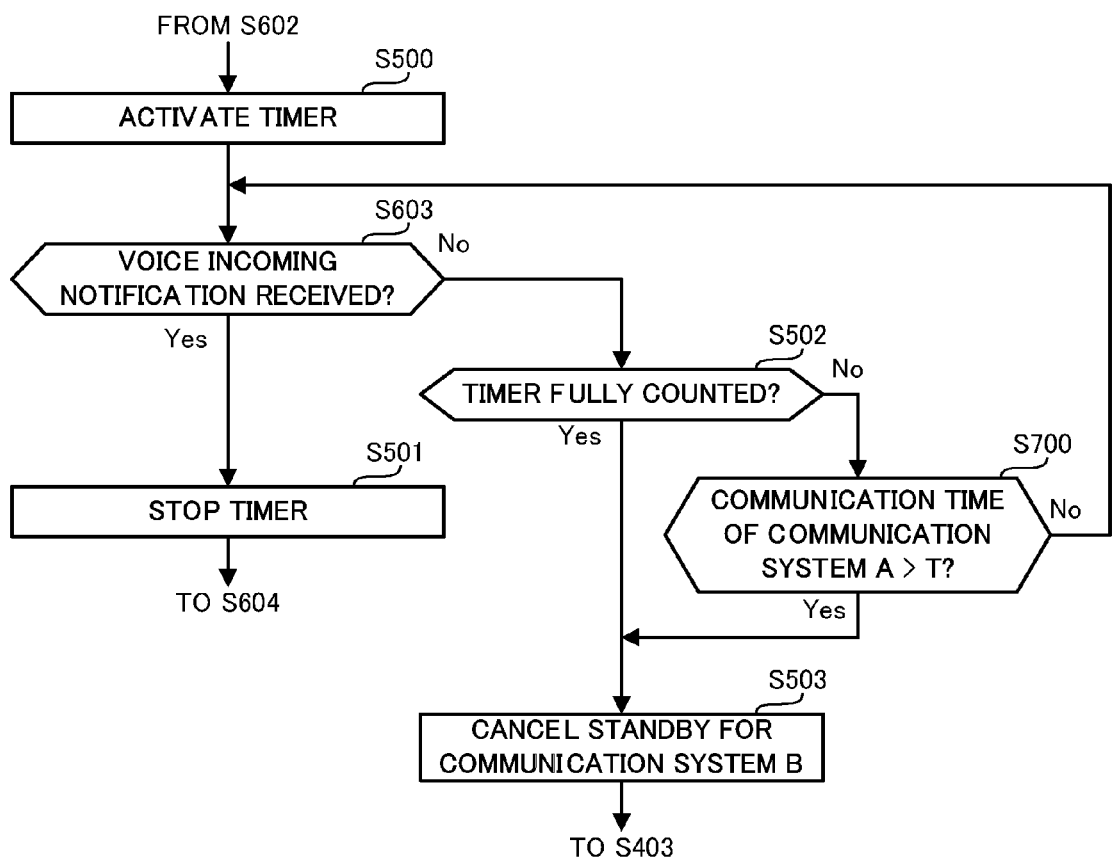
FIG. 7 is a flowchart illustrating the operation of a communication switching process (modification of the second embodiment)

The operation of the second embodiment may be modified as follows. FIG. 7 is a flowchart illustrating the operation of a modification of the communication switching process according to the second embodiment. In this modification, occurrence of a voice incoming event or a voice transmission event is predicted, and when a voice incoming event or a voice transmission event does occur within a given time after the terminal status becomes the standby state for the mobile communication system B, or when the data communication time using the mobile communication system A becomes greater than a predetermined time, the standby state for the mobile communication system B is canceled. Same reference numerals are given to those processes in FIG. 7 which are the same as the corresponding processes in FIGS. 4 to 6 to omit their descriptions.

When the timer has not counted fully in step S502 (step S502; No), the mobile communication terminal 100 discriminates whether the data communication time using the mobile communication system A is greater than a predetermined time T or not (step S700). When the timer has counted fully in step S502 (step S502; Yes), on the other hand, the mobile communication terminal 100 cancels the standby for the mobile communication system B (step S503), and goes to the state of standing by for detection of a predetermined terminal status again (step S403). When it is discriminated in step S700 that the data communication time is greater than the predetermined time T (step S700; Yes), the mobile communication terminal 100 cancels the standby state for the mobile communication system B (step S503), and goes to the state of standing by for detection of the predetermined terminal status again (step S403). When it is discriminated in step S700 that the data communication time is equal to or less than the predetermined time T (step S700; No), the mobile communication terminal 100 stands by for reception of the voice incoming notification (step S603).

Through the above processing, when a voice transmission/incoming process is not carried out for a predetermined time, or when data communication using the mobile communication system A is not carried out for a predetermined time, the standby for the mobile communication system B is canceled to make the power consumption in standby mode smaller.

The timer time may be set to be N times the incoming period (wireless frame including a Paging timing) of the LTE where N is an arbitrary integer. With this setting, it is possible to avoid standing by in the mobile communication system B in a wireless frame zone where an incoming timing does not lie. The time T is set so that the inequality of timer time>T>0 is satisfied.

Further, in step S700, instead of discriminating whether the data communication time is greater than the predetermined time T or not, the terminal-status detecting unit 109 may discriminate whether a predetermined application installed in the mobile communication terminal 100 is activated. When the predetermined application is not activated, the mobile communication terminal 100 goes to step S603 to stand by for reception of a voice incoming notification. When the predetermined application is activated, on the other hand, the mobile communication terminal 100 goes to step S503 to cancel the standby state for the mobile communication system B, and goes to the state of detecting a predetermined terminal status (step S403).

The predetermined application is an application which is not associated with the voice communication, such as a camera application, a TV application, a browser application, or a mail application or the like.

As apparent from the above, in case where an application which is not associated with voice communication is activated, the power consumption in standby mode can be made smaller by canceling the standby for the mobile communication system B, when the possibility of the user's performing a transmission operation is reduced.

As described above, when the mobile communication terminal 100 of the invention determines that it is very likely that communication using the mobile communication system B is carried out in the standby state for the mobile communication system A, the mobile communication terminal 100 goes to the state where communication using the mobile communication system B is possible. Even in the standby state for the mobile communication system A, therefore, communication using the mobile communication system B can be started immediately, thus improving the convenience for users.

The present invention is not to be limited to the individual embodiments, but may be modified within the scope of the invention. The configurations of the mobile communication terminal 100 and the flowcharts illustrated in the descriptions of the embodiments are to be considered illustrative, and are not to be limited to the illustrated details of the embodiments. The configuration and the flowchart are optional as long as the functions of the invention are demonstrated.

For example, although in the foregoing description, the terminal-status detecting unit 109 discriminates whether a predetermined application installed in the mobile communication terminal 100 is activated or not, or whether emergency call information is received or not, and the mobile communication terminal 100 shifts to the state where communication using the mobile communication system B is possible, when the predetermined application is activated or when the emergency call information is received, a state other than these states may be detected, so that the mobile communication terminal 100 shifts to the state where communication using the mobile communication system B is possible, upon detection of such a state.

Although the operational program for the control unit 110 of the mobile communication terminal 100 is stored in the storage unit 107 in the foregoing description, the program may be acquired from an external storage medium, or a program transmitted over a network may be stored.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

The whole or part of the exemplary embodiments disclose above can be described as, but not limited to, the following supplementary notes.

(Supplementary note 1) A mobile communication terminal comprising:

a first mobile communication unit that performs communication via a first mobile communication system by a first mobile communication method;

a second mobile communication unit that performs communication via a second mobile communication system by a second mobile communication method;

a terminal-status detecting unit that detects a status of a mobile communication terminal; and a communication switching unit that causes the second mobile communication unit to start a process of acquiring the second mobile communication system to set communication via the second mobile communication system in an enabled status, when the terminal-status detecting unit detects a predetermined terminal status with communication over the first mobile communication system being enabled by the first mobile communication unit.

(Supplementary note 2) The mobile communication terminal according to Supplementary note 1, wherein when the terminal-status detecting unit detects the predetermined terminal status with communication over the first mobile communication system being enabled by the first mobile communication unit, the communication switching unit causes the first mobile communication unit to perform a temporary disconnection process on the first mobile communication system, and causes the second mobile communication unit to start the process of acquiring the second mobile communication system to set communication via the second mobile communication system in an enabled status.

(Supplementary note 3) The mobile communication terminal according to Supplementary note 1, wherein when the terminal-status detecting unit detects the predetermined terminal status with communication over the first mobile communication system being enabled by the first mobile communication unit, the communication switching unit causes the second mobile communication unit to start the process of acquiring the second mobile communication system to set communication via the second mobile communication system in an enabled status, and when communication via the second mobile communication system is started thereafter, the communication switching unit causes the first mobile communication unit to perform a temporary disconnection process on the first mobile communication system.

(Supplementary note 4) The mobile communication terminal according to Supplementary note 1, wherein when communication by the second mobile communication unit is not carried out for a predetermined time after communication over the second mobile communication system is set in the enabled status, the communication switching unit causes the second mobile communication unit to cancel a reception standby status of the second mobile communication system, and causes the first mobile communication unit to perform a temporary disconnection process on the first mobile communication system to set communication via the first mobile communication system in an enabled status.

(Supplementary note 5) The mobile communication terminal according to Supplementary note 4, wherein the predetermined time is N times an incoming period of the first mobile communication method where N is an integer.

(Supplementary note 6) The mobile communication terminal according to Supplementary note 1, wherein when communication via the first mobile communication system is carried out for a predetermined time or longer after communication over the second mobile communication system is set in the enabled status, the communication switching unit causes the second mobile communication unit to cancel a reception standby status of the second mobile communication system, and causes the first mobile communication unit to perform a temporary disconnection process on the first mobile communication system to set communication via the first mobile communication system in an enabled status.

(Supplementary note 7) The mobile communication terminal according to Supplementary note 1, wherein the terminal-status detecting unit detects reception of an emergency call made by the first mobile communication system or the second mobile communication system, and the predetermined terminal status is the emergency call being received.

(Supplementary note 8) The mobile communication terminal according to Supplementary note 1, further comprising a digital broadcast receiving unit, and wherein the terminal-status detecting unit detects reception of a digitally broadcast emergency call via the digital broadcast receiving unit, and the predetermined terminal status is the emergency call being received.

(Supplementary note 9) The mobile communication terminal according to Supplementary note 1, wherein the terminal-status detecting unit detects if a predetermined application is activated, and the predetermined terminal status is the predetermined application being activated.

(Supplementary note 10) The mobile communication terminal according to Supplementary note 9, wherein the predetermined application is an application related to communication to be carried out by the second mobile communication unit.

(Supplementary note 11) The mobile communication terminal according to Supplementary note 1, wherein the first mobile communication method is a communication method suitable for fast data communication, and the second mobile communication method is a communication method suitable for voice communication.

(Supplementary note 12) A computer readable recording medium recording a program that allows a computer to function as:

a first mobile communication unit that performs communication via a first mobile communication system by a first mobile communication method;

a second mobile communication unit that performs communication via a second mobile communication system by a second mobile communication method;

a terminal-status detecting unit that detects a status of a mobile communication terminal; and a communication switching unit that causes the second mobile communication unit to start a process of acquiring the second mobile communication system to set communication via the second mobile communication system in an enabled status, when the terminal-status detecting unit detects a predetermined terminal status with communication over the first mobile communication system being enabled by the first mobile communication unit.

(Supplementary note 13) A mobile communication terminal comprising:

a first mobile communication means that performs communication via a first mobile communication system by a first mobile communication method;

a second mobile communication means that performs communication via a second mobile communication system by a second mobile communication method;

a terminal-status detecting means that detects a status of a mobile communication terminal; and a communication switching means that causes the second mobile communication means to start a process of acquiring the second mobile communication system to set communication via the second mobile communication system in an enabled status, when the terminal-status detecting means detects a predetermined terminal status with communication over the first mobile communication system being enabled by the first mobile communication means.

What is claimed is:

1. A mobile communication terminal comprising:
   a first mobile communication unit that performs communication via a first mobile communication system by a first mobile communication method;
   a second mobile communication unit that performs communication via a second mobile communication system by a second mobile communication method;
   a terminal-status detecting unit that detects a status of a mobile communication terminal; and
   a communication switching unit that causes the first mobile communication unit to perform a temporary disconnection process on the first mobile communication system and thereafter causes the second mobile communication unit to start a process of acquiring the second mobile communication system to set communication via the second mobile communication system in an enabled status, when the terminal-status detecting unit detects a predetermined terminal status with communication over the first mobile communication system being enabled by the first mobile communication unit,
   wherein when communication by the second mobile communication unit is not carried out for a predetermined time after communication over the second mobile communication system is set in the enabled status, the communication switching unit causes the second mobile communication unit to cancel a reception standby status of the second mobile communication system, and causes the first mobile communication unit to perform a temporary disconnection process on the first mobile communication system to set communication via the first mobile communication system in an enabled status, and
   wherein when an application that is not associated with the communication by the second mobile communication unit is activated before the communication by the second mobile communication is carried out for the predetermined time, the communication switching unit causes the second mobile communication unit to cancel a reception standby status of the second mobile communication system, and causes the first mobile communication unit to perform a temporary disconnection process on the first mobile communication system to set communication via the first mobile communication system in an enabled status.

2. The mobile communication terminal according to claim 1, wherein the predetermined time is N times an incoming period of the first mobile communication method where N is an integer.

3. The mobile communication terminal according to claim 1, wherein the terminal-status detecting unit detects reception of an emergency call made by the first mobile communication system or the second mobile communication system, and
the predetermined terminal status is the emergency call being received.

4. The mobile communication terminal according to claim 1, further comprising a digital broadcast receiving unit, and wherein
the terminal-status detecting unit detects reception of a digitally broadcast emergency call via the digital broadcast receiving unit, and
the predetermined terminal status is the emergency call being received.

5. The mobile communication terminal according to claim 1, wherein the terminal-status detecting unit detects if a predetermined application is activated, and
the predetermined terminal status is the predetermined application being activated.

6. The mobile communication terminal according to claim 5, wherein the predetermined application is an application related to communication to be carried out by the second mobile communication unit.

7. The mobile communication terminal according to claim 1, wherein the first mobile communication method is a communication method suitable for fast data communication, and
the second mobile communication method is a communication method suitable for voice communication.

8. A non-transient computer readable recording medium recording a program that allows a computer to function as:
a first mobile communication unit that performs communication via a first mobile communication system by a first mobile communication method;
a second mobile communication unit that performs communication via a second mobile communication system by a second mobile communication method;
a terminal-status detecting unit that detects a status of a mobile communication terminal; and
a communication switching unit that causes the first mobile communication unit to perform a temporary disconnection process on the first mobile communication system, and thereafter causes the second mobile communication unit to start a process of acquiring the second mobile communication system to set communication via the second mobile communication system in an enabled status, when the terminal-status detecting unit detects a predetermined terminal status with communication over the first mobile communication system being enabled by the first mobile communication unit,
wherein when communication by the second mobile communication unit is not carried out for a predetermined time after communication over the second mobile communication system is set in the enabled status, the communication switching unit causes the second mobile communication unit to cancel a reception standby status of the second mobile communication system, and causes the first mobile communication unit to perform a temporary disconnection process on the first mobile communication system to set communication via the first mobile communication system in an enabled status, and
wherein when an application that is not associated with the communication by the second mobile communication unit is activated before the communication by the second mobile communication is carried out for the predetermined time, the communication switching unit causes the second mobile communication unit to cancel a reception standby status of the second mobile communication system, and causes the first mobile communication unit to perform a temporary disconnection process on the first mobile communication system to set communication via the first mobile communication system in an enabled status.

9. A mobile communication terminal comprising:
a first mobile communication means that performs communication via a first mobile communication system by a first mobile communication method;
a second mobile communication means that performs communication via a second mobile communication system by a second mobile communication method;
a terminal-status detecting means that detects a status of a mobile communication terminal; and
a communication switching means that causes the first mobile communication means to perform a temporary disconnection process on the first mobile communication system, and thereafter causes the second mobile communication means to start a process of acquiring the second mobile communication system to set communication via the second mobile communication system in an enabled status, when the terminal-status detecting means detects a predetermined terminal status with communication over the first mobile communication system being enabled by the first mobile communication means,
wherein when communication by the second mobile communication unit is not carried out for a predetermined time after communication over the second mobile communication system is set in the enabled status, the communication switching unit causes the second mobile communication unit to cancel a reception standby status of the second mobile communication system, and causes the first mobile communication unit to perform a temporary disconnection process on the first mobile communication system to set communication via the first mobile communication system in an enabled status, and
wherein when an application that is not associated with the communication by the second mobile communication unit is activated before the communication by the second mobile communication is carried out for the predetermined time, the communication switching unit causes the second mobile communication unit to cancel a reception standby status of the second mobile communication system, and causes the first mobile communication unit to perform a temporary disconnection process on the first mobile communication system to set communication via the first mobile communication system in an enabled status.

10. The mobile communication terminal according to claim 1, wherein the second mobile communication method is suitable for voice communication, and wherein the terminal-status detecting unit detects a predetermined terminal status in which an application associated with the voice communication is activated and a telephone number is entered on the application.

* * * * *